Sept. 10, 1929.　　　K. N. VARTABEDIAN　　　1,728,142
DISPENSING DEVICE
Filed Jan. 7, 1927
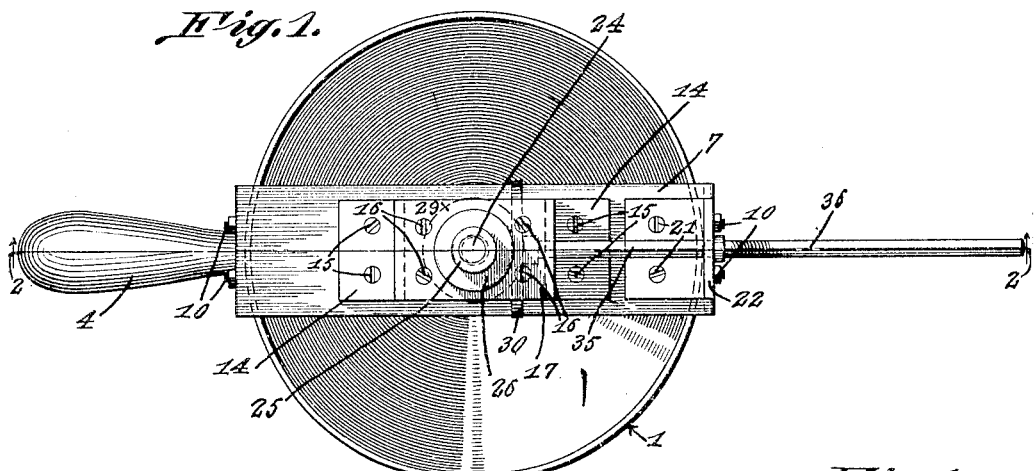
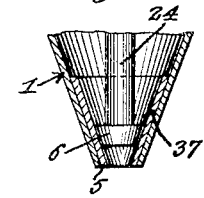
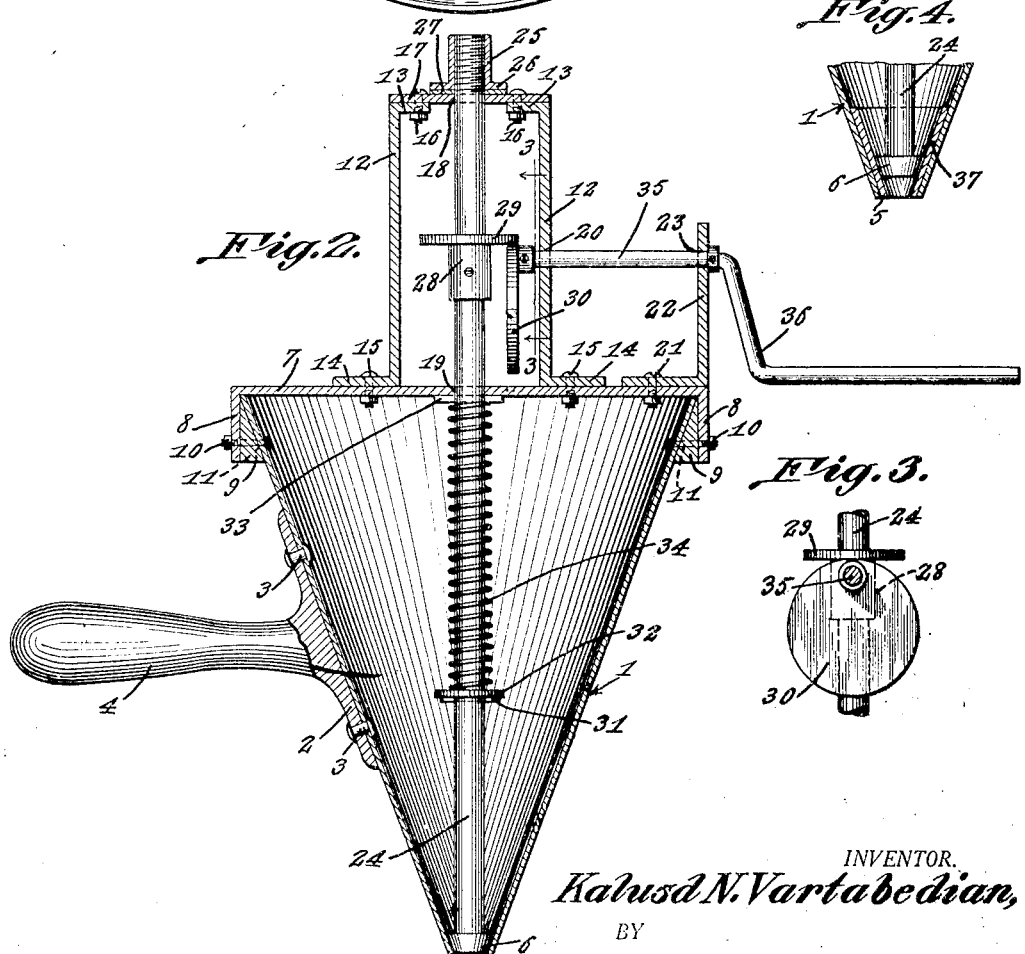
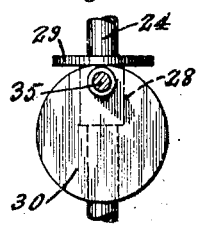
INVENTOR.
Kalusd N. Vartabedian,
BY
Geo. P. Kimmel
ATTORNEY.

Patented Sept. 10, 1929.

1,728,142

UNITED STATES PATENT OFFICE.

KALUSD N. VARTABEDIAN, OF CHICAGO, ILLINOIS.

DISPENSING DEVICE.

Application filed January 7, 1927. Serial No. 159,631.

This invention relates to a dispensing device, designed primarily for use in connection with liquid dough, but it is to be understood that a dispensing device, in accordance with this invention, can be employed for any purposes for which it is found applicable, and the invention has for its object to provide, in a manner as hereinafter set forth, a device for dispensing therefrom, bulks of liquid dough of predetermined size to be acted upon by a frying medium for the dough, or in other words for dropping predetermined size bulks of liquid dough into a cooking or frying medium therefor.

Further objects of the invention are to provide, in a manner as hereinafter set forth, a device of the class described which is simple in its construction and arrangement, strong, durable, compact, thoroughly efficient in its use, conveniently operated and comparatively inexpensive to manufacture.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

Figure 1 is a top plan view of a dispensing device in accordance with this invention.

Figure 2 is a section on line 2—2 Figure 1.

Figure 3 is a section on line 3—3 Figure 2.

Figure 4 is a fragmentary view illustrating a container element provided with a reducer means changing the size of the outlet of the container element.

Referring to the drawings 1 indicates a container of inverted frusto-conical contour and which is provided with a handle of any suitable construction for the purpose of holding it when the device is employed for discharging bulks of liquid dough to be cooked or fried, and by way of example, the form of handle as illustrated, comprises a base 2 which is fixedly secured against the outer face of the container, intermediate the ends thereof, by the holdfast devices 3 and extending laterally from the base 2 as well as being formed integral therewith, is a hand grip 4. The lower or reduced end of the container 1 provides a discharge outlet 5 and which is normally closed by a conoidal shaped valve 6.

Mounted upon the top of the container 1, is a flat diametrically extending supporting plate 7, provided at each end with a depending flange 8 which opposes and is spaced from the upper portion of the container 1. Interposed between the flanges 8 and the container 1 are diametrically disposed filler members 9. Holdfast devices 10 are employed for connecting the container 1, filler members 9 and flanges 8 together. The inner faces of the filler members 9 are beveled, as at 11 so as to conform to the contour of the container 1. The filler members 9 are flush with the top edge of the container 1.

Mounted upon the plate 7, is a pair of spaced, oppositely disposed, vertically extending supports 12 and each of which is provided at its upper end with an inwardly extending flange 13 and at its lower end with an outwardly extending flange 14. The flanges 14 are fixedly secured to the plate 7, by holdfast devices 15. Mounted upon the upper ends of the support 12, as well as being fixedly secured therewith by the holdfast devices 16, is a plate 17, provided with a centrally arranged opening 18, and said opening 18 alines with a centrally arranged opening 19 formed in the plate 7. One of the supports 12, intermediate its ends is formed with an opening 20. Secured to the upper face of the plate 7, at one end thereof, by the holdfast device 21, is a bracket 22, provided with an opening 23 which alines with the opening 20. Formed integral with the top of the valve 6, and of less diameter than the diameter of the upper end of the valve 6, is a spring controlled plunger rod 24 of a length to extend up through the openings 18 and 19 and above the plate 17. The upper end of the plunger rod 24 is peripherally threaded, as at 25, and which has secured therewith a stop member 26, having its lower end provided with a washer 27, which forms a cushioning medium. The stop member 25 is in the form of a flanged collar provided with interior threads and with the flange at its lower end and against the flange is secured the washer 27. Fixedly secured to the plunger rod 24, at a point above the plate 7, is a sleeve 28 having its upper end formed with a laterally disposed annular flange 29, which in connection with an eccentrically mounted disk 30 provides a shifting means for the plunger rod 24. Extending through the rod 24, at a point within the container 1, is a pin 31, which supports a washer or collar 32 and the rod 24, at a point a substantial distance above the pin 21, carries a diametrically extending pin 33. Mounted on the rod 24 and interposed between the washer 32 and pin 33 is a coiled controlling spring 34 which normally acts to maintain the valve 6 in closure position with respect to the discharge outlet 5. The rod 24 is shifted upwardly by the disk 30 against the action of its controlling spring 34 and as the disk 30 is eccentrically mounted, the discharge outlet 5 will be open for a predetermined period. The disk 30 is revolubly mounted, eccentrically connected to the means for revolving it, and under such conditions during one revolution of the disk 30, the rod 24 will be elevated and lowered by the disk 30, in connection with the controlling spring 34. When the disk 30 is revolved the edge thereof riding against the flange 29, in connection with the spring 24, will provide for the reciprocation of the rod 24 under such conditions opening and closing the outlet 5.

Journaled in the openings 20 and 23, is a manually operated shaft 35 for revolving the disk 30. The shaft 35 extends through that support 12 provided with the opening 20, and is connected to the disk 30 in proximity to the edge thereof, see Figure 2. The shaft 35 also extends through the bracket 22, and is provided with a crank or handle 36 at its outer end.

The size of the discharge outlet 5 can be reduced, when desired, and for such purpose a conoidal shaped reducer 37 can be inserted in the container 1, at the reduced or lower portion thereof.

One revolution of the disk 30 provides for the opening and closing of the outlet 5 and during the time from the opening to the closing thereof a predetermined amount of liquid dough will be discharged from the container 1. The diameter of the disk 30 can be varied and under such conditions the amount of liquid dough discharged can also be varied. The larger the disk the larger the body of dough discharged and the smaller the disk the smaller amount of dough discharged.

The plates 7 and 17, provide guides for the rod 24, as well as maintaining it axially at all times with respect to the container 1. One of the supports 12 and the bracket 22 provide a supporting means for the disk 30 and its operating shaft.

It is thought the many advantages of a liquid dough dispensing device, in accordance with this invention, can be readily understood, and although the preferred embodiment of the invention is as illustrated and described, yet it is to be understood that changes in the details of construction can be had which will fall within the scope of the invention as claimed.

What I claim is:

A dispensing apparatus comprising a container of inverted conoidal shape and having an outlet at its lower end, a supporting plate extending diametrically of the top of the container, of less width than the diameter of the latter and having a depending flange at each end thereof, said plate further formed with an opening, said flanges opposing the outer periphery of said container, filler members interposed between said flanges and the container and having beveled inner faces, means for securing said flanges, members and container together, an upstanding inverted yoke-shaped element secured upon said plate and having an opening in its top aligning with the opening in the plate, an upstanding support secured at one end to the plate, a spring controlled valvular device extending through said openings for normally closing said outlet and provided at its upper end with a stop arranged exteriorly of the top of said element, said spring controlled valvular device provided with a collar formed with a flange, said collar positioned above the top of said container, and an eccentrically mounted, rotatable means mounted in said support at one side of the flange of said element and engaging with the lower face of said collar for intermittently shifting said device against the action of its controlling spring to intermittently open said outlet.

In testimony whereof, I affix my signature hereto.

KALUSD N. VARTABEDIAN.